United States Patent Office 2,715,023
Patented Aug. 9, 1955

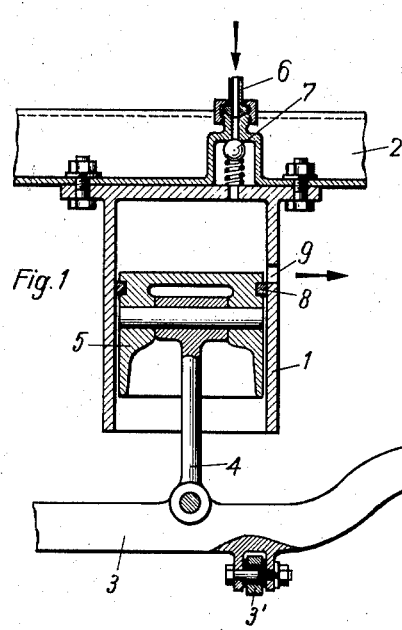
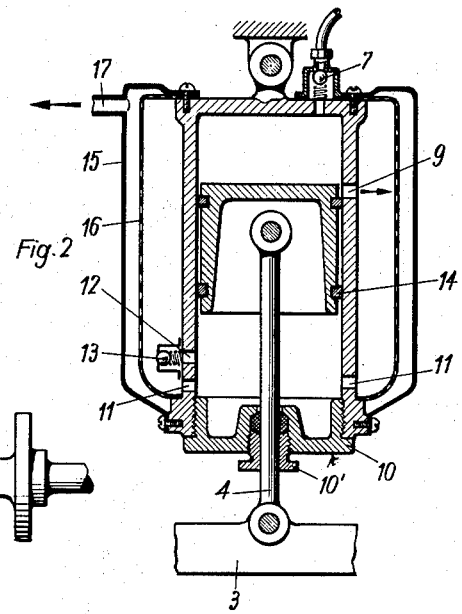
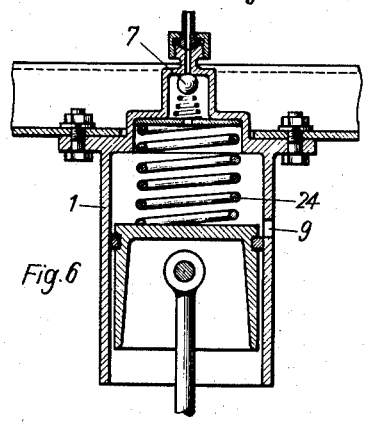
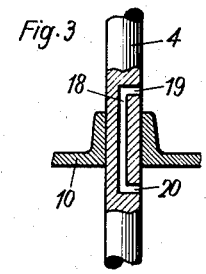
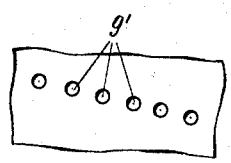
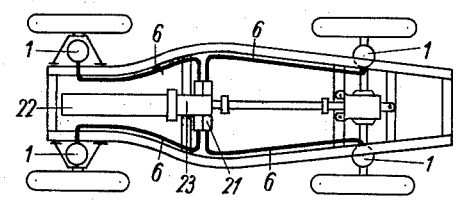

2,715,023

PNEUMATIC SPRINGING SUSPENSION FOR MOTOR VEHICLES

Friedrich K. H. Nallinger, Stuttgart, Germany

Application October 26, 1949, Serial No. 123,606

Claims priority, application Germany November 12, 1948

7 Claims. (Cl. 267—65)

This invention pertains to a pneumatic spring suspension for vehicles. A particular object of this invention is a method for holding the springing suspension, operating through a pneumatic means in a predetermined medium position. A further object of this invention is to produce a pressure which is proportionate to the individual loads, another one to provide a suitable absorption of shocks, further the designing of the springing suspension, and the shock absorbing device. The expression "pneumatic means" or "pneumatic medium" is to be understood as comprising all compressible fluid means of pressure which may be used as springing means.

Disadvantage of pneumatic suspensions, as far as they are used in vehicles, consists in that the sprung portion of the vehicle is maintained in positions at different heights above ground which are proportionate to the individual loads carried by the vehicle. This disadvantage causes trouble particularly with such vehicles for instance busses and trucks, as they carry loads varying to a considerable extent. This occurs, for instance with busses, chiefly because of the passenger loading, and with trucks due to loading and unloading at platforms, railway carriages and the like. Still, cumbersome and detrimental effects of different static loads causing different medium height positions of the springing suspension occur in all other vehicles, too.

One feature of this invention, instead, consists in that the springing suspension is continuously held in the same medium position, whatever the weight of the load might be. This may be obtained, for instance by controlling the pneumatic medium (for instance compressed air) which acts on a piston sliding in a cylinder, in dependence of the springing stroke in such a way as to cause the pressure in the cylinder to increase when the springing movement of the sprung portion of the vehicle exceeds a predetermined medium position, thus having it act opposite to the springing movement until this predetermined medium springing position has been resumed.

The pneumatic medium, for instance compressed air is hereby suitably controlled by the springing piston itself or by a member hooked together with same, such as a piston ring, the piston rod, etc., in such a way as to have air under pressure admitted continuously into the cylinder, and permitted to flow out of the same through an opening which is shut off by the piston, or the like, when reaching a predetermined position. Moreover, each of several springing cylinders of the vehicle should preferably be equipped with a separate air pump to avoid use of more complicated control devices. The individual pumps, which may be of very small size, will suitably be aggregated in a complete unit.

A further feature of this invention consists in that the pneumatic springing is working together with a shock-absorber or springing brake, operating by means of compression or repulsion of the pneumatic medium, for instance air. Due to the fact that both springing suspension and shock absorption are based on an akin principle, particularly simple and organically combined and operating sets may be desired. A specially simple construction is obtained by having the piston side opposite to the pneumatic spring serve as a shock absorber or cylinder brake, for instance in such a way as to have said piston side closed up by a cylinder top interspersed, for instance through a stuffing box, by the piston rod, whereby a strong braking action can be obtained e. g. when the sprung portion of the vehicle springs up due to the compression of the air contained in the rear side of the piston. Absorption of work by having air entered and permitted to flow off will result in a shock-absorbing action. This can easily be obtained by providing one or more throttle openings in the braking or shock-absorbing cylinder. The air will be sucked in during the outward stroke of the piston and expulsed during the inward stroke of the same. The openings may hereby remain continuously open (uncontrolled) or be mechanically or automatically controlled, for instance in such a way as to have the air sucked in with relatively small throttling, and, instead, repulsed with relatively strong throttling. Control and dimensions may hereby be adapted to the individual purposes. Besides that, control and throttle openings may be adjustable.

The drawing shows some examples of embodiment of the invention.

Fig. 1 shows a simple pneumatic springing device without shock absorber,

Fig. 2 shows a pneumatic springing device with a shock absorber aggregated with same to form a set, Fig. 3 shows a control of the shock absorber by means of the piston rod, Fig. 4 shows a diagrammatic plan view of a vehicle chassis with 4 pneumatically sprung wheels.

Fig. 5 shows a side view of a portion of the cylinder wall, and

Fig. 6 shows a modified embodiment of the invention being provided with an additional helical spring.

In the embodiment according to Fig. 1, piston 5, coupled with vehicle axle 3 through piston rod 4 slides in cylinder 1 which is, for example, attached to vehicle frame 2. The axle, for instance, is guided by lateral thrust stays 3'. The compressed air is admitted into the cylinder by means of an air pump (not shown in Fig. 1) which may be driven by the vehicle engine through line 6 and suitably through a check valve 7 and can flow off through opening 9 controlled by the piston or by a piston ring 8.

When the vehicle stands still or is running on a plain surface, and fresh compressed air is admitted continuously into the cylinder, piston 5 will take the very position in which opening 9 is still just cleared by piston ring 8 whereby the amount of compressed air flowing off through opening 9 will be as large as it is necessary to obtain in the interior of the cylinder a pressure balancing such portion of the vehicle load as it falls to the springing cylinder. The pressure of the compressed air continuously admitted will hence suitably correspond at least to the specific springing pressure resulting from the maximum load of the vehicle. The adjustment of the piston is hereby essentially independent of the vehicle load. When the load of vehicle becomes heavier so that cylinder and piston have first of all the tendency to move toward each other and to shut off opening 9, the space of the cylinder above the piston will fill with compressed air coming from line 6 and the pressure in the cylinder will increase until opening 9 will be again cleared by piston 5 and pressure of the compressed air will cease to increase because of the flowing off of the compressed air.

When the vehicle rolls and hence the piston slides to and fro due to the springing movement, the outlet is alternatively passed over on one or the other side by the piston or piston ring and thus alternatively completely covered and again cleared. Still, in this case too, a medium state, namely, a medium air pressure will come into existence and hence the piston will reach a medium position which corresponds to the above outlined motionless state of the springing suspension of the vehicle.

In the embodiment according to Fig. 2, the lower part of the piston is formed as a shock-absorber. To this purpose the lower part of the cylinder is shut off by a cover 10 interspersed by piston rod 4, for instance through a stuffing box 10' or the like. The air can enter the space underneath the piston and flow out of the same through a throttle opening 11 or several throttle openings. To increase the shock-absorbing action, an additional opening 12 may be provided, which is controlled by a valve 13 which is controlled or opens automatically during the upward stroke of the piston. In this case the upward stroke of the piston causes a relatively little throttling action, whereas the downward stroke of the piston results in a relatively strong throttling and hence a strong damping of the springing movement.

Bores 11 and 12 are moreover arranged in such a way as to be covered at the end of the downward stroke of the piston or of the upward stroke of the cylinder, respectively, for instance by piston 5 or a piston ring 14 successively. When the piston passes over the respective position, the air will not be permitted to flow off any longer, the compression will considerably increase and the movement of the piston will be energetically braked down.

Air openings and lines will suitably be equipped with air filters. To ensure that as trifle an outward movement of air as possible takes place, it is recommended to have all openings or lines run into a collecting chamber, and only then have the latter communicate with the atmosphere through a common filter. This chamber is shown in Fig. 2 in the shape of a jacket which is concentric with the cylinder. In this jacket there is a filter 16 provided with a large surface which divides the chamber into two concentrical chambers. The outer chamber leads to the atmosphere through a line 17.

Fig. 3 shows an arrangement in which the connection between the shock absorbing chamber resulting from the lower piston side and the atmosphere is controlled by the piston rod. To this purpose the piston rod is provided with an axial opening 18 from which the two cross openings 19 and 20 lead to the exterior of the piston rod. The latter are arranged in such a way as to connect the shock absorbing chamber underneath the piston with the atmosphere only within specific medium limits of the springing stroke, whereas outside these limits the connection is shut off, thus producing an energetic braking action.

As shown in Fig. 4 illustrating diagrammatically by way of example a vehicle chassis, the four wheels of the vehicle are individually sprung by means of a pneumatic device 1, which is, for instance, designed as illustrated in Fig. 1 or 2. Therein, the inlet pipes 6 lead from pumps 21—one separate pump being provided for each of the pneumatic devices—deliver the pneumatic medium (for instance compressed air) and are driven by engine 22, for instance by a transverse shaft of the speed change gear 23 or by other suitable means. All pumps may also be aggregated in a pump unit, or all pneumatic devices may have a common pump.

The invention is not restricted to the embodiments illustrated, and may be realized in essentially different constructive ways. Thus, for instance, instead of providing in the cylinder an outlet controlled by the piston or the piston ring, a control opening for the escaping air may be provided at a completely different place and the control of the opening may be provided in such a way as to operate in dependence of the piston position by means of a mechanical, electric, hydraulic or pneumatic device. In lieu of a single opening 9, several openings 9' may, moreover, be provided in the same or, if necessary (as shown in Fig. 5), in a position at a somewhat different height in the direction of the piston stroke. Moreover, an appropriate outlet may be controlled, for instance as shown in Fig. 3, by the piston rod, too. The piston may moreover be attached to the vehicle frame and the cylinder to an axle of the vehicle.

The opening, or openings, for the admission of the air sucked in or the flowing off of the air repulsed from the shock absorbing chamber of the cylinder either dependent on the piston stroke or also by means of a special device, if so desired, may be controlled in a similar way as the outlet for the flowing off of the compressed air from the piston side of the cylinder providing the springing action, for instance in such a way as to produce a progressive shock absorbing action. Moreover, piston 5 or the cylinder tops may suitably be shaped in such a way that only a small dead space comes into existence when extreme upward and downward positions are reached by the piston, thus producing a particularly energetic braking down of the piston when the latter approaches these extreme positions.

Pneumatic springing can moreover be combined with any other springing systems, for example, a steel springing which may be arranged (for instance as an helical spring 24) inside (as shown in Fig. 6) or outside the pneumatic springing system. This offers, among others, the advantage that the sprung portion of the vehicle rests on the steel spring suspension when the vehicle stands still for a long time, and the air leaves slowly the pneumatic springing device.

The springing suspension can be used as well with independent wheels (for instance provided with swinging axles) as with fixed axles. In the second case the fixed axle must be provided with special guide devices (such as 3' in Fig. 1) designed for taking up the longitudinal and transversal forces. Springing may be furthermore used in vehicles of all kinds, including aeronautical and railway vehicles.

What I claim is:

1. Device for a vehicle suspension operating through a pneumatic medium comprising a cylinder and a cooperating piston, one of said cylinder and piston being attached to an axle member of the vehicle, and the other to the suspended vehicle body, the cylinder being closed at both ends and the piston defining a working chamber at one end of the cylinder decreasing in volume upon upward movement of the axle member relative to the vehicle body, the working chamber being provided with means for admitting a pneumatic medium into the cylinder and means for discharging the pneumatic medium from the cylinder dependent upon the position of the piston relative to the cylinder, the piston also defining a damping chamber at the other end of the cylinder, the cylinder being surrounded by a jacket defining a collection chamber, the means for discharging comprising at least one opening connecting the collecting chamber with the working chamber, and at least one opening connecting the collecting chamber with the damping chamber, whereby the pneumatic medium flowing from the working chamber to the collecting chamber may flow therefrom into the damping chamber to exert therein a damping effect.

2. Device according to claim 1 in conjunction with a filter provided in the collecting chamber which encloses the openings communicating with the working chamber and with the damping chamber, and an outlet from the collecting chamber outside the said filter.

3. A vehicle suspension device operating through a pneumatic medium and comprising a cylinder and a cooperating piston, one of said cylinder and piston being attached to a member of a vehicle axle, and the other to the suspended part of the vehicle, said cylinder further being closed at both ends, one piston side of said cylinder defining a working chamber for the pneumatic medium, the other piston side of said cylinder defining a damping chamber filled with pneumatic medium and exerting a damping action on said piston when the latter is displaced by a predetermined stroke from the mean position in said cylinder; first means in said cylinder positioned outside of the working zone of said piston for the primary admission of a pneumatic medium into said cylinder in opposition to the pressure of the pneumatic medium exerted by said piston in response to the vehicle weight, means for supplying a medium to said first means under pressure, and at least one discharge port in the surface of said cylinder surrounding and guiding said piston for discharging a part of the pneumatic medium from said cylinder thereby to vary the quantity of the medium flowing through said cylinder until said piston returns to a predetermined mean position corresponding to at least a small continuous stream of the medium flowing through said cylinder; and an outer joint collecting chamber into which the pneumatic medium flows from the working chamber, said outer joint collecting chamber being further connected with said damping chamber through an uncontrolled opening and through an opening controlled in response to the piston stroke.

4. Apparatus for mounting the frame of a vehicle upon an axle comprising a cylinder and a piston, one of said frame and axle being connected to said cylinder and the other to said piston, an inlet port in said cylinder for passing a pneumatic medium into said cylinder independently of the position of said piston in said cylinder, a discharge port positioned in said cylinder, the position of said piston with respect to said discharge port regulating the discharge of the pneumatic medium through said discharge port and said piston normally uncovering a portion of said discharge port to control the rate of discharge of said pneumatic medium from said cylinder while pneumatic medium is entering said cylinder through said inlet port, a source of pneumatic medium coupled to said inlet port and maintaining sufficient pressure to cause a flow of pneumatic medium through said cylinder and discharge port when a maximum static load is placed in said vehicle, a check valve cooperating with said inlet port to pass said pneumatic medium in one direction only from said source into said cylinder, said cylinder being closed at both ends thereof with said piston dividing said cylinder into a working chamber and a damping chamber, a damping port connected to said damping chamber, and a jacket enclosing at least the portions of said cylinder wherein said damping and discharge ports are positioned.

5. Apparatus as claimed in claim 4 comprising an air filter enclosed in said jacket, said jacket having an opening into the atmosphere, said air filter enclosing said discharge and damping ports to minimize the discharge of pneumatic medium into the atmosphere.

6. Apparatus according to claim 4 wherein a plurality of discharge ports are provided spaced in the axial direction of said cylinder.

7. Apparatus for mounting the frame of a vehicle upon an axle comprising a cylinder and a piston, one of said frame and axle being connected to said cylinder and the other to said piston, an inlet port in said cylinder for passing a pneumatic medium into said cylinder independently of the position of said piston in said cylinder, a discharge port positioned in said cylinder, the position of said piston with respect to said discharge port regulating the discharge of the pneumatic medium through said discharge port and said piston normally uncovering a portion of said discharge port to control the rate of discharge of said pneumatic medium from said cylinder while pneumatic medium is entering said cylinder through said inlet port, a source of pneumatic medium coupled to said inlet port and maintaining sufficient pressure to cause a flow of pneumatic medium through said cylinder and discharge port when a maximum static load is placed in said vehicle, a check valve cooperating with said inlet port to pass said pneumatic medium in one direction only from said source into said cylinder, said cylinder being closed at both ends thereof with said piston dividing said cylinder into a working chamber and a damping chamber, a piston rod provided with an axial channel with spaced cross openings in said piston rod forming a damping port connected to said damping chamber, and a jacket enclosing at least the portions of said cylinder wherein said discharge port is positioned.

References Cited in the file of this patent

UNITED STATES PATENTS

| Number | Name | Date |
|---|---|---|
| 820,707 | Downer | May 15, 1906 |
| 1,036,340 | Rockwell et al. | Aug. 20, 1912 |
| 1,087,305 | Lane | Feb. 17, 1914 |
| 1,258,355 | Mullen | Mar. 5, 1918 |
| 1,426,057 | Fritz | Aug. 15, 1922 |
| 1,544,850 | Messier | July 7, 1925 |
| 1,742,690 | Chapman | Jan. 7, 1930 |
| 1,974,171 | Bizzarri | Sept. 18, 1934 |
| 2,021,043 | Bedford et al. | Nov. 12, 1935 |
| 2,115,072 | Hunt et al. | Apr. 26, 1938 |

FOREIGN PATENTS

| Number | Country | Date |
|---|---|---|
| 3,659 | Great Britain | of 1903 |
| 529,338 | France | Nov. 26, 1921 |